United States Patent [19]

Lebas et al.

[11] 4,330,251

[45] May 18, 1982

[54] DEVICE FOR MANUFACTURING ARTICLES OF COMPACTED POWDER

[75] Inventors: Jean-Marie Lebas, Rueil-Malmaison; Pierre Rat, Massy; Jean-Marcel Dupont; Germain Vinuesa, both of Angouleme, all of France

[73] Assignees: Basset Bretagne Loire-BBL; Societe National des Poudres et Explosifs, both of France

[21] Appl. No.: 72,584

[22] Filed: Sep. 5, 1979

[30] Foreign Application Priority Data

Sep. 12, 1978 [FR] France ................................ 78 26140

[51] Int. Cl.³ ............................................. B29D 7/00
[52] U.S. Cl. ......................... 425/405 H; 425/DIG. 44
[58] Field of Search .................... 425/405 H, DIG. 44

[56] References Cited

U.S. PATENT DOCUMENTS 3,529,321  9/1970  Culand ............................ 425/405 H
3,571,854  3/1971  Lundstrom ..................... 425/405 H Primary Examiner—James R. Hall
Attorney, Agent, or Firm—Steinberg & Raskin

[57] ABSTRACT

A method and a mould for manufacturing articles of compacted powder by isostatic compression of powder in a mould, which is made of flexible material of substantially constant thickness and is substantially barrel-shaped, the mould having at one end a bottom made integral with the rest of the mould and being adapted to be closed by a separate plug at its other end.

16 Claims, 6 Drawing Figures

DEVICE FOR MANUFACTURING ARTICLES OF COMPACTED POWDER

The present invention relates generally to a device for manufacturing articles or elements of pressure agglutinated, agglomerated, coalesced or consolidated powder, hereinafter referred to as "compacted powder" or "compact", obtained by compressing a predetermined amount of powder in molds.

The said device relates more particularly to the manufacture of unit charges of compacted powder for small-, medium- and large-caliber arms ammunition and small self-propelling appliances. The invention, however, also applies to the manufacture of any unit articles or elements of compacted powder, e.g. of metal, metal alloy or any other material in powder form, which are obtained by filling molds with powder in bulk and then compressing the same to form unit elements of compacted powder.

The molds used in the prior art are metal moulds constituted by hollow cylinders at least one end of which is closed by a movable punch of a press. Each molds is filled with powder and then the punch or punches actuated by the press move within the mold and compress the powder. Very good dimensional characteristics are thus obtained, as the molds and the punch or punches are substantially undeformable. However, as a direct result of the mechanical compression of the powder within the molds by means of the punch or punches, the density of the compact resulting from the compression is not uniform throughout the mass of the article thus obtained. Where the articles are unit charges of compacted propelling powder, this final poor homogeneity results in an uneven combustion of the powder and therefore a deterioration of the firing or shooting characteristics.

Moreover, the mechanical compression of the powder in a metal molds in a press requires considerable investment and the production rates are very low. The manufacture of such articles therefore proves to be highly expensive.

Attempts have therefore been made, in the manufacture of unit articles or elements of compacted powder, to replace mechanical compression in metal molds and by means of metal punches by isostatic pressing in molds of flexible and/or resilient material, which are filled with powder, closed substantially sealingly and placed in a pressure chamber filled with a substantially incompressible fluid in order to be subjected to isostatic compression. It has been found that much better results can thus be obtained from the point of view of the final homogeneity of the elements (and more particularly a highly even density, therefore a highly even combustion and very good firing characteristics) and of the production rates, which are extremely improved compared with those of the mechanical presses, while at the same time considerably reducing investments.

However, such important improvements in the final density of the articles and in production rates are obtained to the detriment of the dimensional characteristics. These, which were excellent in the mechanical compression method, are much poorer in the case of isostatic compression, for the molds of flexible and/or resilient material are necessarily deformed during the compression. It has been found that this deformation is uneven and much more marked in the intermediate region of the molds than in its sealingly closed end regions, so that the compacted powder articles obtained do not have a perfectly straight cylindrical shape but are smaller in diameter in their intermediate region than at their ends.

The purpose of the present invention is precisely to remedy the drawbacks of the above two known methods while at the same time retaining their advantages.

The invention is therefore directed to a device for manufacturing unit articles or elements of compacted powder displaying very good dimensional characteristics and highly uniform density and which can be manufactured at very high production rates and with much less investments than in the case of mechanical compression.

To this end, the invention provides a molds for manufacturing articles or elements of compacted powder obtained by compressing a predetermined amount of powder in the molds, characterized in that the molds is an isostatic compression mould made of a flexible and/or resilient material of substantially constant thickness and intended to be confined with its powder charge in a pressure chamber filled with a substantially incompressible fluid in order to be subjected in the said chamber to an isostatic compression, the said molds having a substantially cylindrical tubular shape, comprising for example at one end a bottom portion formed integral with the rest of the molds, and the opposite end of which can be closed by a removable plug, the said molds being substantially barrel-shaped and being of larger inner diameter in its intermediate portion than at its ends.

It is understood that this shape characteristic according to the invention allows the shape unevenness displayed formerly by a compacted powder element obtained in a molds of perfectly straight cylindrical shape to be compensated for.

Also disclosed is a method of manufacturing unit articles or elements of compacted powder, by means of molds of the previously described type, characterized in that it consists in filling each molds with a predetermined amount of powder, in closing the molds by means of the aforementioned plugs, in arranging them in a pressure chamber filled with a substantially incompressible fluid, in compressing the fluid to subject the molds and their powder charge to isostatic compression for a predetermined length of time, in restoring the normal pressure and then in removing the molds from the chamber and withdrawing from the molds the articles obtained.

It is understood that, according to the disclosed method, a large quantity of molds can be placed within a same pressure chamber to subject them simultaneously to isostatic compression, thus quite considerably increasing production rates.

The invention also relates to the unit articles of elements of compacted powder obtained by means of the mold according to the invention or by carrying out the disclosed method.

The invention will be better understood and other purposes, characterizing features, details and advantages of the latter will appear more clearly from the following explanatory description made with reference to the appended diagrammatic drawings given solely by way of example illustrating two forms of embodiment of the invention and wherein.

Figure 1:
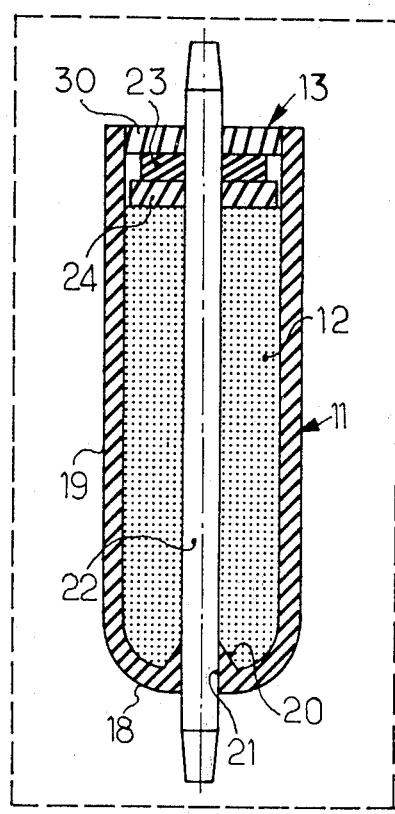
FIG. 1 is a diagrammatic view of a mold according to the invention filled with powder and placed in an isostatic compression chamber represented in dashed lines.

There is diagrammatically shown in FIG. 1 a device for manufacturing unit articles or elements of pressure agglutinated, agglomerated, coalesced or consolidated powder referred to as "compacted powder" or "compact", according to the invention, which comprises essentially a pressure chamber 10 represented conventionally by dashed lines and which is intended to contain a large number of molds 11 according to the invention filled with a predetermined amount of powder 12 and substantially sealingly closed at their open end by a plug, stopper or the like 13.

The chamber 10 may be of any suitable type known in the art and is filled substantially completely with an incompressible fluid such as oil, which can be subjected to high pressure, e.g. of the order of from 1000 to 1500 bars during an appropriate predetermined length of time. Chambers of this type are well known in the art and will therefore not be described in more detail.

Figure 2:
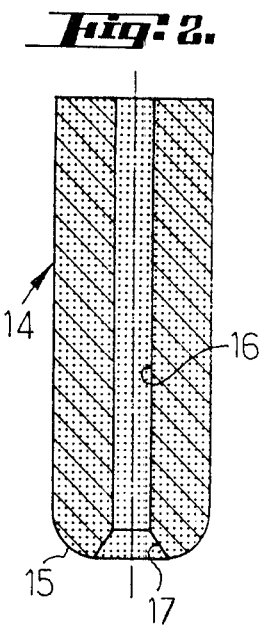
FIG. 2 is a sectional view of a compacted unit article obtained by the mold of the invention.

In the specific example of embodiment illustrated in the drawings, the articles to be obtained may be, in particular, unit charges of compacted propelling powder for small-, medium- and large-caliber arms ammunition and for small self-propelling appliances, one of which is shown in section in FIG. 2.

The unit charge 14 is of substantially straight cylindrical shape, one end of which is of plane cross-section and circular periphery, and the opposite end of which is rounded off at the angles as shown in the drawing. The unit charge 14 has an axial bore 16 opening at the rounded end 15 through a counter-sunk portion 17. The bore 16 may be of constant circular section as shown in FIG. 2, but it may, in some cases, be of non-uniform section varying regularly, gradually or by steps.

In the case of a unit charge 14 to be used for ammunition, it is constituted by nitrocellulose-based powder grains which are agglutinated, agglomerated or bound together by means of a gelatinizing plasticizer for nitrocellulose, which is liquid at a temperature lower than or equal to about 80° C. and which is present in a small predetermined amount. The process of manufacture of such unit charges therefore consists in impregnating the nitrocellulose-based powder grains with a geletanizing plasticizer, in stabilizing the powder grains thus impregnated by allowing them to stand at room temperature for a predetermined length of time, in placing the powder grains in a mold, in heating the mold and its contents to a temperature preferably approximating 80° C., in subjecting the powder charge to a predetermined pressure, in cooling the mold and its contents and in removing from the mold the unit charge thus obtained.

According to the mold, the compression to which the powder is subjected is an isostatic compression by means of the device illustrated in FIG. 1.

In this example, the mold 11 is closed at one end by a bottom wall 18 formed integral with the substantially cylindrical portion 19 of the mold, the other end of the mold 11 being open and intended to be closed by the removable plug 13. The bottom 18 of the mold 11 is provided with an axial inwardly-protruding annular boss, neck or collar 20 externally shaped substantially as a truncated cone, intended to form the countersunk portion 17 of the unit charge 14. The truncated conical collar or neck 20 is provided with an axial bore 21 through which is substantially sealingly mounted within the mold 11 an axial core 22.

Figure 6:
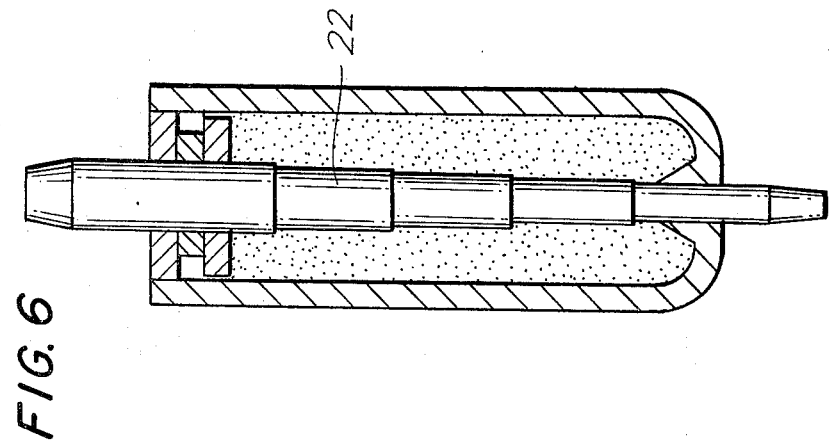
FIGS. 5 and 6 are views similar to FIG. 1 and illustrating the use of tapered and stepped cores, respectively.
Figure 5:
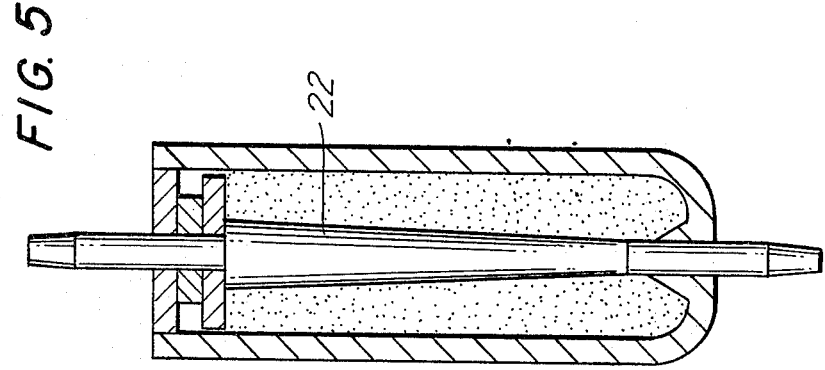

The axial core 22 is made of a rigid, substantially undeformable material, e.g. of metal. The core 22 is intended to form the axial bore 16 of the unit charge. It may therefore be of either constant circular section or of circular section varying regularly, gradually or by steps as seen in FIGS. 5 and 6. The core 22 is greater in length than the mold 11 so as to protrude from the mould at both its ends, which, in order to facilitate the mounting of the core in the mold, may be of truncated conical shape as shown in FIG. 1.

In the case of a mold 11 provided with a core 22, the plug 13 is constituted by superposed annular discs or rings 30, 23 and 24, respectively, all provided with an axial opening allowing them to be engaged substantially sealingly onto the metal core 22. The ring 30 has a diameter substantially equal to the inner diameter of the open end of the mold 11 so as to substantially sealingly close that end. The inner ring 24 is slightly smaller in diameter, corresponding substantially to the final diameter of the unit element 14 to be obtained. The ring 24 is intended to bear upon the powder charge 12 placed within the mold 11. Lastly, the intermediate ring 23 is slightly smaller in diameter than the inner ring 24 and serves as a spacer piece the purpose of which will be explained below in more detail.

Of course, in the case of a mold 11 that is not provided with an axial core 22, the plug 13 is constituted by plane discs instead of rings.

The mold 11 and the rings 30, 23 and 24 are made of flexible and/or resilient material, advantageously of rubber. In the case considered, where the powder must also be subjected to a heating up to a temperature of about 80° C., use is advantageously made of molds and rings of neoprene, which withstands higher temperatures, for example of the order of 100° C. or more.

Figure 3:
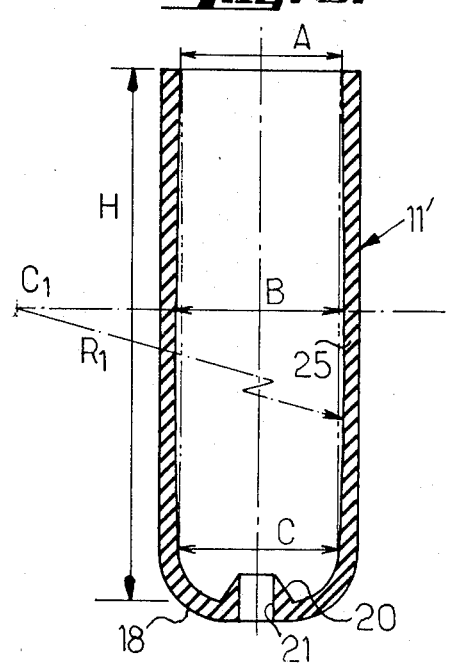
FIG. 3 is a sectional view of a mold according to a first form of embodiment of the invention.
Figure 4:
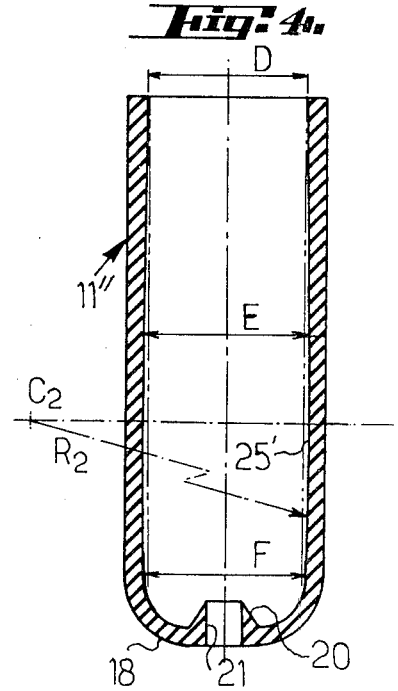
FIG. 4 is a sectional view of a mold according to a modified form of embodiment of the invention.

According to the invention, the mold 11 is of substantially constant thickness, except of course at the collar 20 formed at the bottom 18, and in its normal condition is substantially barrel-shaped, that is to say, its inner diameter in its medial or axially intermediate portion is greater than its inner diameter in proximity to its ends, as seen better in FIGS. 3 and 4.

The mold 11' shown in FIG. 3 comprises a bottom portion 18 provided with a collar or neck 20 with an axial bore 21 and its inner diameter A at its open end is equal to its inner diameter C in proximity to the bottom 18, whereas its inner diameter B at the middle of its height is greater than the diameters A and C. Each generatrix 25 of the substantially cylindrical portion of the mold 11' is formed substantially by an arc of a circle whose radius of curvature R1 is of relatively great length compared with the height of the mold 11'. The centers of curvature C1 of the generatrices 25 are located substantially at the middle of the height of the mold 11' of FIG. 3.

In the form of embodiment illustrated in FIG. 4, the mold 11" also comprises a rounded bottom portion 18 provided with an axial inwardly-protruding annular boss, neck or collar 20 with an axial bore 21, and its diameter E in its medial region is greater than its inner diameter F at its bottom 18, which itself is greater than the diameter D at its open end. As in the preceeding case, each generatrix 25' of the cylindrical portion of the mold 11" is constituted by an arc of a circle whose radius of curvature R2 is of relatively great length compared with the height of the mold 11", but the centers of curvature C2 are shifted towards the bottom 18, that is to say, they are located nearer to the bottom 18 than to the open end of the mould. This arrangement may prove to be advantageous in some cases in order to better compensate for the unevenness in shape of the element to be obtained, due to the proximity of the bottom 18 and the collar 20.

In order to obtain the "barrel" shape suitable for a given application, a test can be carried out under specific grain-size and temperature conditions, with a mold that is either cylindrical or of barrel-shape already obtained, in order to measure the compacting bend, flexion or buckling. The measured differences between the element obtained and the article to be obtained allow the profile of the "barrel" shape of the final mold to be determined.

By way of example, it may be mentioned that the molds 11' and 11" may display the following dimensional characteristics in their normal condition:
A=C=32.6 mm;
B=33.8 mm;
R1=1880 mm;
D=32.2 mm;
F=32.8 mm;
E=33.4 mm;
R2=2500 mm;
the total height of the molds being of the order of 110 mm.

The method of using such molds is as follows.

The cores 22 are first placed into the molds 11, then the molds are filled with a predetermined amount of powder and are thereafter closed by means of the rings 24, 23, 30 which are engaged in this order onto the corresponding end of the core 22. It will be noted by the way that the plug 13 may also be formed in a single piece having the shape of the rings 30, 23 and 24 superposed on one another. The molds 11 thus prepared are placed into the chamber 10 and subjected to isostatic compression under a pressure of the order of from 1000 to 1500 bars. The total duration of treatment of the molds 11 in the chamber 10 is of the order of about 5 minutes including the building up and the removal of pressure in and from the chamber. In the case of propelling powder charges for ammunition, which are constituted by nitrocellulose-based powder grains impregnated with a gelatinizing plasticizer, the molds are also subjected within the chamber to a temperature of the order of 80° C. approximately.

When the normal pressure is restored in the chamber, the moulds 11 are withdrawn from the chamber and the unit charges 14 are extracted from the molds. Extraction from the moulds is performed without difficulty, for the volume occupied within the mold by the compacted powder is smaller than the internal volume of the mold in its normal state. A certain clearance therefore exists between the inner surface of the mould and the compacted powder charge. Nor does the extraction of the core present any difficulty because, during the compression, the small volume of air contained in the powder gathers around the core 22, thus forming a kind of film between the core and the surface of the axial bore 16 of each unit charge 14.

The charges 14 thus obtained display good dimensional characteristics and have a substantially straight cylindrical shape, the maximum bend, flexion or buckling observed does not exceed 2/10ths of a millimeter in the case of an outer diameter of about 29 mm. By way of example, it may be mentioned that if use is made of a mold 11 which in its normal condition has a substantially cylindrical shape, the charges 14 obtained will display in their middle region a bend of about 1 mm in the case of a diameter of about 29 mm.

Also the dimensional characteristics of the charge 14 in the region of its ends are quite satisfactory. In particular, the presence of the spacer ring 23 in the removable plug 13 allows the edge or fringe effect due to the plug 13 closing the end of the mold 11 to be attenuated. Indeed, the end of the mold 11 displays an unevenness in shape and thickness with respect to the rest of the mold, which unevenness results in a dimensional unevenness of the plane end face of the charge 14. This final dimensional unevenness is the less marked, the greater the distance between this end of the charge 14 and the ring 30 closing the mold 11. The distance ring 23 is precisely used for this purpose.

Of course, the invention is by no means limited to the forms of embodiment described and illustrated, which have been given by way of example only. In particular, it comprises all means constituting technical equivalents to the means described as well as their combinations should the latter be carried out according to its gist and used within the scope of the following claims.

What is claimed is:

1. A mold for use in connection with the manufacture of articles of compacted particulate material through isostatic compression, comprising:
   a vessel formed of flexible or resilient material having a side wall defined by internal and external faces, said side wall having at least approximately a cylindrical shape and substantially constant wall thickness, said vessel being open at one end thereof;
   a bottom wall integrally formed with said side wall at the end of said vessel opposite from said open end thereof;
   a removable plug insertable into said open end to close same; and
   wherein said side wall throughout its thickness including said internal and external faces thereof is curved radially outwardly over at least a portion intermediate of said ends thereof
   whereby upon the application of external isostatic pressure, said side wall formed of flexible material is deformed to assume a substantially perfect cylindrical shape.

2. A mold according to claim 1 wherein said side wall is defined by a generatrix having a center of curvature spaced from the generatrix by a radius of curvature and wherein the generatrix of said side wall is an arc.

3. A mold according to claim 2 wherein said side wall has a longitudinal dimension or height and the center of curvature of said generatrix is located substantially at the middle of the longitudinal dimension or height of said side wall and the ratio of the radius of curvature to the height of said side wall is approximately of the order of 1880:110.

4. A mold according to claim 2 wherein said side wall has a longitudinal dimension or height and the center of curvature of said generatrix is located closer to said bottom wall than to said open end of said vessel and the ratio of the radius or curvature to the height of said side wall is approximately of the order of 2500:110.

5. A mold according to claim 1 wherein said removable plug is formed having an outer periphery of a diameter as to be completely insertable in fitting relationship into said vessel.

6. A mold according to claim 5 wherein said removable plug comprises at least two discs of resilient material superposed with respect to each other; the outer disc forming said outward end portion of said removable plug being adapted to close and seal said open end of said vessel, and the inner disc having a diameter slightly smaller than the inner diameter of said vessel in the region of the open end thereof.

7. A mold according to claim 6 wherein said plug comprises an intermediate disc constituting a spacer between said outer and inner discs, whereby the latter are spaced from each other.

8. A mold according to claim 1 wherein said vessel is provided with a core of substantially incompressible material extending within said vessel throughout its height and in coaxial relationship therewith and extending through said bottom wall of said vessel in sealing engagement therewith.

9. A mold according to claim 8 wherein said plug consists of ring-shaped discs through which said core extends in substantially sealing engagement therewith.

10. A mold according to claim 8 wherein said bottom wall is formed with an inwardly projecting collar of substantially frusto-conical shape extending coaxially within said vessel.

11. A mold according to claim 8 wherein said core has an elongated shape of substantially circular cross-section.

12. A mold according to claim 11 wherein said circular cross-section is constant.

13. A mold according to claim 11 wherein the diameter of said circular cross-section increases in a continuous manner along the height of said vessel.

14. A mold according to claim 11 wherein said circular cross-section increases in a stepwise manner along the height of said vessel.

15. A mold according to claim 1 wherein said vessel and plug are formed of a resilient material which can withstand temperatures of at least 80° C. to 100° C.

16. A mold according to claim 15 wherein said material comprises neoprene.

* * * * *